Jan. 2, 1934.   H. T. KRAKAU   1,942,175
SHOCK ABSORBING MECHANISM
Filed Aug. 22, 1928   3 Sheets-Sheet 2
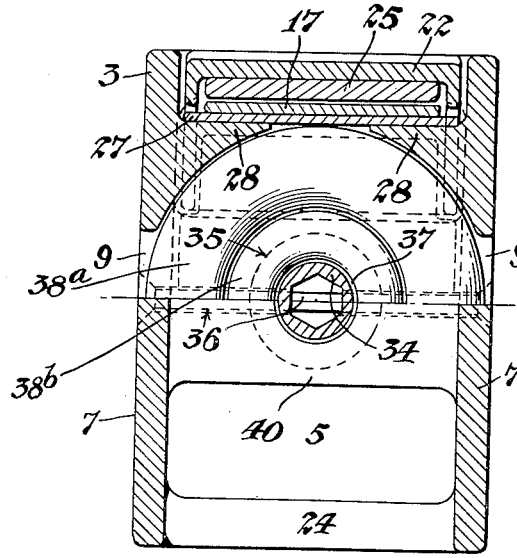
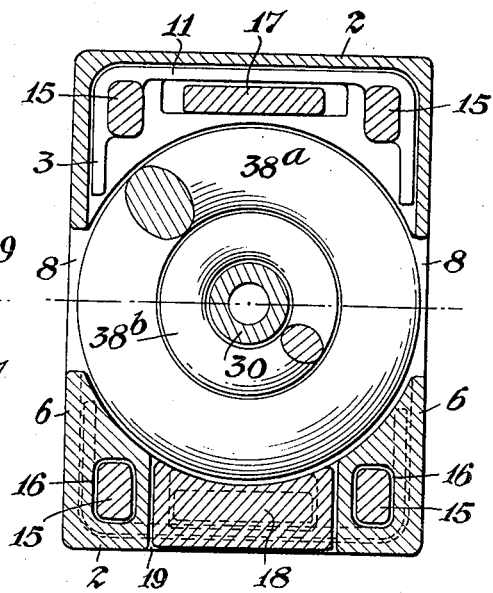
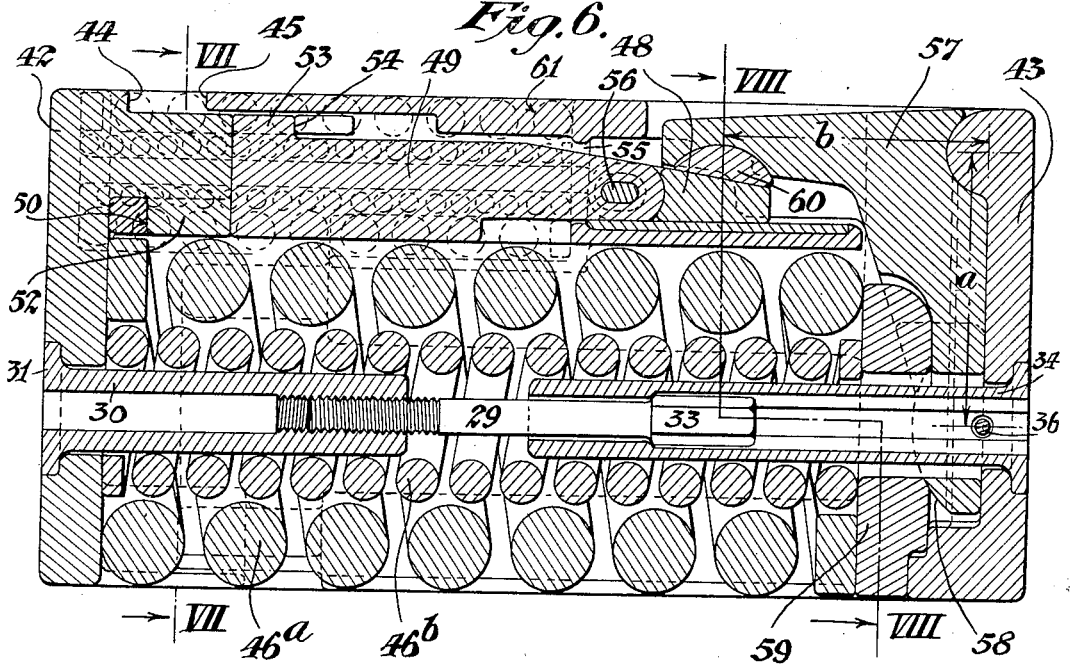
INVENTOR
Harry T. Krakau
BY
Clarence Kerr
ATTORNEY

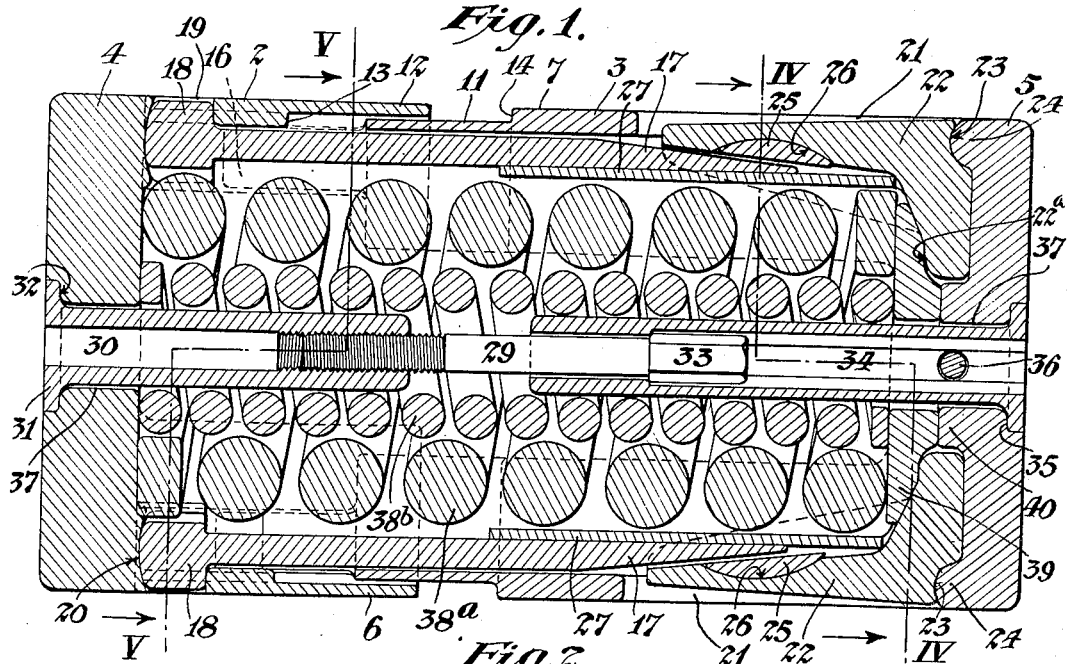
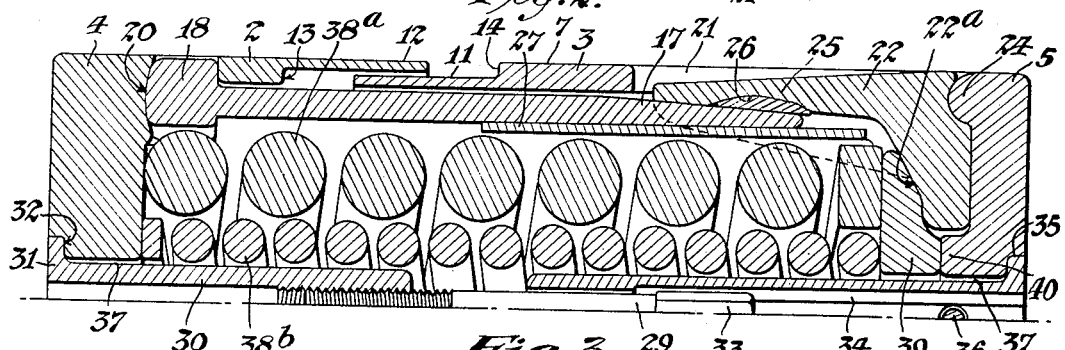
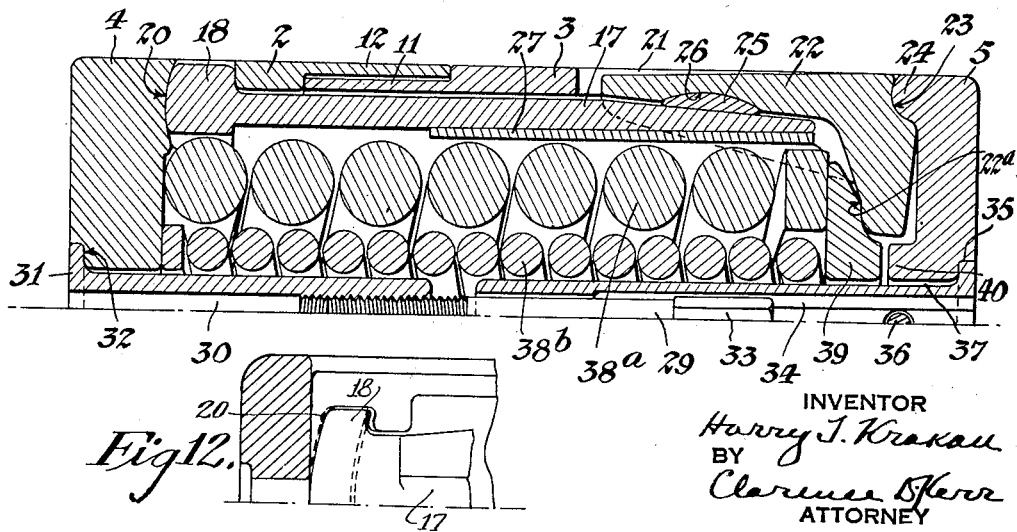

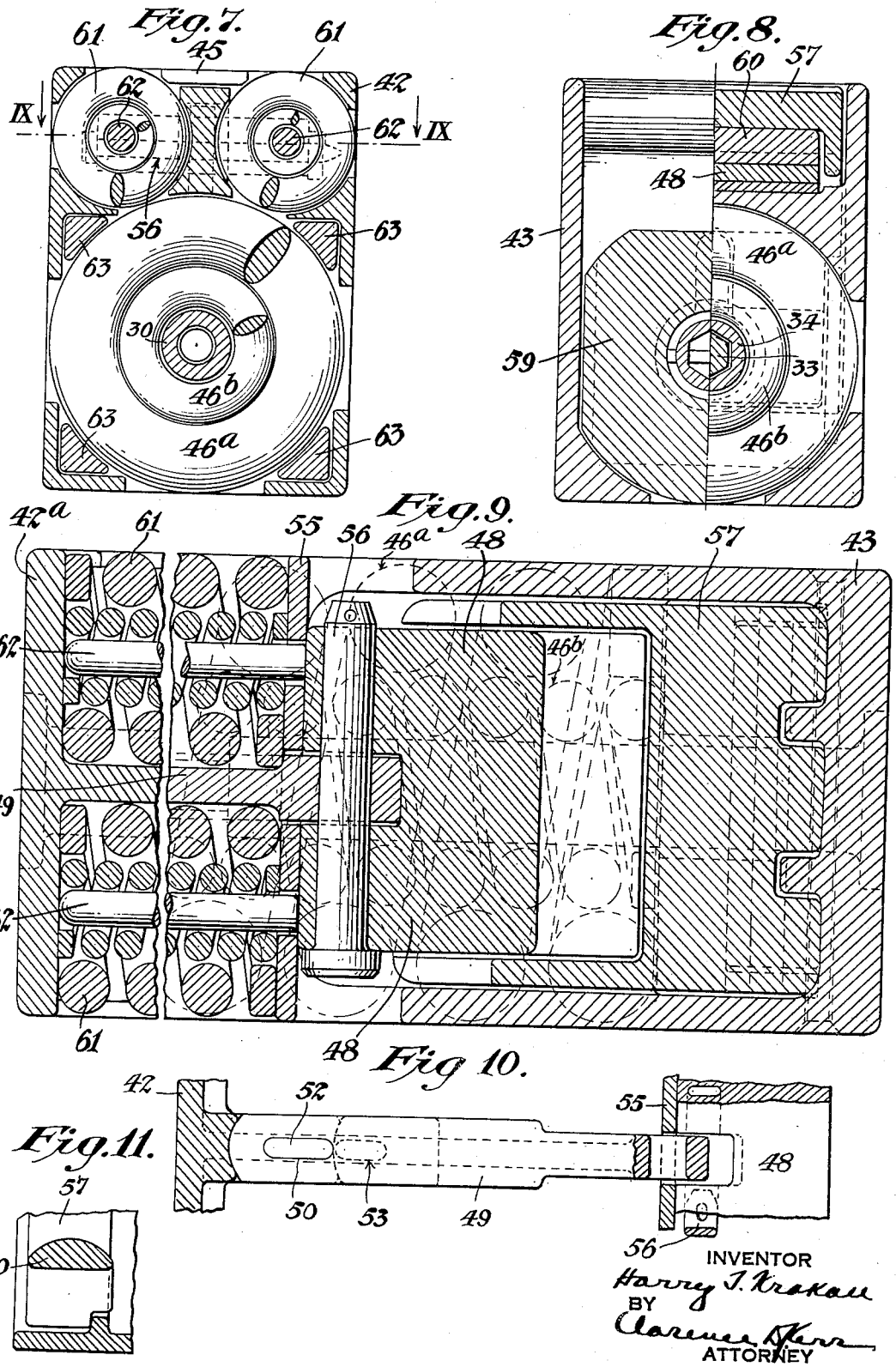

Patented Jan. 2, 1934

1,942,175

UNITED STATES PATENT OFFICE 1,942,175

SHOCK ABSORBING MECHANISM

Harry T. Krakau, Cleveland, Ohio, assignor to National Malleable and Steel Castings Company, Cleveland, Ohio, a corporation of Ohio Application August 22, 1928. Serial No. 301,322

6 Claims. (Cl. 213—28)

My invention relates to improvements in shock absorbing mechanism and is particularly designed to eliminate difficulties encountered in many forms of shock absorbing mechanism now in commercial use. I have found, for instance, that with a number of forms of commercially used friction draft gears when a gear is under draft strain for a long distance without cessation the tendency of such gears is to creep solid, even when the draft load upon the gear is but a small fraction of the rated capacity of the gear and not appreciably above the mere spring capacity of such gear. My observations of the operation of such gears have led me to believe that because in service there are momentary fluctuations in the load on the gear and a continuous angling action of the coupler and draft attachments on curves, this results in an uneven or eccentric application of the load on the draft gear and thus tends to break the friction grip of the parts of the gear and to allow the gear to creep solid. I have also observed that when the draw bar pull of the locomotive is decreased slowly as the throttle is closed, the tendency of the gears is not to release until the draw bar pull has dropped down appreciably below the spring capacity of the gears, which normally ranges from 15,000 to 40,000 pounds, and when the gears have released the action is apt to be so sudden as to result in an appreciable jolt or jar.

My improved mechanism is so constructed that it will respond to the load upon it in such manner that its travel both in compression and in release is aproximately proportional to the load upon it. My improved mechanism preferably has a spring resistance greater than the maximum tractive effort of the locomotive, so that, regardless of how long continued is the buffing or pulling strain, it is obvious that the gear will never creep solid. It will also be seen that the release action of such a mechanism will be sufficiently powerful to permit the gears to release as the draft or buffing pressures diminish. The frictional capacity of the gear in conjunction with its high spring capacity is sufficient to take care of the dynamic buffing and draft shocks met under modern service conditions. Because of the high capacity of the springs used in my gear, its frictional capacity need not be nearly as high as in other types of gear. In other words its ratio of spring capacity and frictional capacity is much higher than has hitherto been used. My invention also comprises various features which I shall hereinafter describe and claim.

In the accompanying drawings, Fig. 1 is a horizontal longitudinal section of a shock absorbing mechanism embodying my invention, with the parts in normally released position; Fig. 2 is a half section similar to Fig. 1 but showing the gear under moderate compression and the frictional parts in engagement; Fig. 3 is a half-section similar to Fig. 1 but with the parts in fully compressed position; Figs. 4 and 5 are sections, respectively, on lines IV—IV and V—V of Fig. 1; Fig. 6 is a horizontal longitudinal section showing a modified form of my invention; Figs. 7 and 8 are sections, respectively, on lines VII—VII and VIII—VIII of Fig. 6; Fig. 9 is a horizontal section on line IX—IX of Fig. 7; Fig. 10 is a detail of the friction member, stem, and associated parts; Fig. 11 is a detail of the friction equalizer and seat in the friction lever; and Fig. 12 is a detail in vertical section along the center line of the casing showing a portion of the latter with the springs and securing means removed.

Referring more particularly to the drawings, the mechanism illustrated in Figs. 1 to 5, inclusive, is especially adapted for application to passenger cars. The telescoping casings 2 and 3 shown in this form of my invention have bases 4 and 5 and walls 6 and 7 which are slotted at 8 and 9 to allow for the maximum possible diameter of the compression spring $38^a$, and thereby provide a gear which may be applied to draft sills of normal spacing and yet have a spring capacity far in excess of the spring capacity of the gears now in commercial use.

The outer casing 2 has a telescopic fit with the inner casing 3, the reduced section 11 of the wall 7 of the casing 3 telescoping inside the end portion 12 of the wall 6 of the outer casing 2. The casings 2 and 3 are provided with shoulders 13, 14, upon which to take up the oversolid blows. In addition if desired the inner casing 3 may be provided with four projections 15, as is shown in Fig. 5, which extend up into corresponding pockets 16 in the outer casing 2 and thus assist to guide the two casings and also to carry the oversolid blows.

Extending within the inner casing 3 are two friction members 17, each of which has at one end, adjacent the base 4, an enlarged head 18 which seats in a recess 19 in the outer casing 2. The head 18 also has a spherical face 20 engaging a correspondingly arc-shaped inner face in the recess 19 of the base 4, so as to provide a sort of ball and socket joint to permit the friction member 17 to adjust itself to angular blows.

The inner casing 3 has apertures 21 in its sides, in each of which is seated a friction cushion lever 22, preferably boot shaped, the heel of which has an arc-shaped bearing 23 engaging the fulcrum boss 24 on the inner face of the base 5. Each lever 22 also has on its inner surface a friction equalizer 25 seating in an arc-shaped recess 26 in the lever 22. The purpose of the friction equalizer 25 and their seats 26 is to permit them to rock relative to the levers 22 and thus always present flat bearing surfaces against the members 17 regardless of the angularity of the face of the lever thereto.

The friction members 17 and levers 22 are tapered toward the open ends of the casings in which they are seated. The inner casing also has friction plates 27 welded or otherwise secured to the walls 28 within the inner casing, as is best shown in Fig. 4. The plates 27 are frictionally engaged by and form a base of resistance for the friction members 17.

The casings 2 and 3 are held together by a tie bolt 29, which at one end is threaded to engage the threaded thimble 30 which is inserted through the base 4 of the casing 2 and is kept from turning relative to such casing by reason of its square head 31, which is seated in a squared recess 32 in the casing. The head 33 of the tie bolt 29, which may be of hexagonal or other angular shape, seats in the thimble 34 which has a bearing in the circular recess 35 in the base 5 of the casing 3 and is held from rotation relative to such base by means of the pin 36. The inner base of the thimble 34 is preferably hexagonal so that the thimble with the bolt 29 can be turned with a wrench inserted in the bore of the thimble. It is to be noted that clearance is provided as at 37 between the thimbles and bases, so that the casings 2 and 3 can angle slightly without straining or otherwise distorting the thimbles 30 and 34.

The springs which I have shown in the form of two elements 38$^a$ and 38$^b$ preferably seat at one end against the base 4 and at the other against a spring follower 39, which has a bearing against a central projection 40 on the base 5 and also upon the surface 22$^a$ on the toe of the friction lever 22.

My improved mechanism is operated as follows: With the gear in the released position, as is shown in Fig. 1, a slight clearance is indicated between the friction levers 22 and the friction members 17. As the gear is compressed in buff or draft the casings will move one toward the other. Such action will be at first resisted by the springs 38$^a$ and 38$^b$ only, which tends to prevent the shock or jar which usually results from the frictional resistance building up too quickly.

As the springs are compressed by the endwise movement of either casing toward the other, the clearance indicated in Fig. 1 between the friction members 17 and the lever 22 is taken up, and the tapered ends of the friction members 17 are forced inwardly between the levers 22 and the friction plates 27, as is shown in Fig. 2. The plates 27 are rigid with the casing 3 and hence the inward movement of the tapered members 17 cannot cause the movement of the plates 27. The levers 22, as their ends toward the open end of the casing are free to move, are therefore forced outwardly, i. e., are rotated outwardly about the bosses 24 on the base 5. This rotation or rocking action of the levers lifts the follower 39 and compresses the springs 38$^a$ and 38$^b$, which resists such rocking movement of the levers 22 and react against the levers, causing them to react through their friction equalizers 25 against the friction faces of the members 17 and increase the frictional pressure of the members 17 against the friction plates 27, as is shown in Fig. 3.

It will be seen that the pressure which causes the friction between the plates 27, members 17 and equalizer 25 is exerted only by the levers 22, it is therefore always substantially proportional to the pressure exerted by the springs.

As the pressure abates, the compressive force of the springs on the levers 22 lessens, diminishing the frictional pressure of the levers 22 on the members 17 and on the plates 27. When the pressures are released the springs will drive the casings as far apart as the tie bolt 29, or the draft stops of the car (not shown), will permit, thus restoring the parts to the position shown in Fig. 1.

In Figs. 6 to 11, inclusive, I have illustrated another form of my invention which is particularly adapted for use on freight cars.

The two casings 42 and 43 have the same telescoping action as in the mechanism shown in Figs. 1-5, with stop shoulders 44 and 45 to take up oversolid blows. The coils 46$^a$ and 46$^b$ of the main spring element may be of the same capacity as in the preceding figures, but I have shown only one friction member 48 and one friction cushion lever 57. The friction member 48 is in the form of a friction block with a supporting stem 49. The stem 49 has at one end an elongated slot 50 to receive a tongue 52 of casing 42, and also a projection 53 which enters a slot 54 in the casing 42 so as to provide a firm anchorage to the casing 42. At the opposite end the stem 49 extends through an aperture in the vertical wall 55 in the casing 43, beyond which it is attached to the friction member 48, which is of considerable lateral extent, as is best shown in Fig. 9. The friction member 48 is secured to the stem 49 by a transversely extending key 56. The taper on the friction member 48 is quite steep, so as to assist in developing increased friction. The toe of the lever extends beyond the axis of the springs 46$^a$ and 46$^b$, and its inner face has an arc-shaped boss 58 engaging the spring follower 59 so as to provide a compensating bearing to take care of the various angular positions occupied by the lever 57 as the gear compresses or releases. The lever 57 receives the entire capacity of the springs 46$^a$ and 46$^b$. As the lever arm $a$ against which the spring reacts is longer than the lever arm $b$, which carries the friction equalizer 60, a given spring pressure will cause a considerably greater frictional pressure, which, however, is proportional to the spring pressure, just as with the gear shown in Figs. 1-5.

To provide a spring resistance sufficient to withstand the maximum drawbar pull of a freight locomotive I have shown two auxiliary springs 61. These springs 61 extend between the base 42$^a$ and the wall 55. Within each auxiliary spring 61 is a rod 62 which at one end bears against the base 42$^a$ and at the other end extends through an aperture in the wall 55 to bear against the friction member 48. The rods 62, assist the stem 49 to resist the frictional thrust of the friction member 48, while the shoulders 44 and 45, and the members 63 of the casing 43 (which come into bearing on the casing 42) serve to distribute and take up oversolid blows.

The gear shown in Figs. 6 to 11 is intended to develop a minimum spring capacity greater than the maximum running tractive effort of any freight locomotive now in use. At the same time my improved gear is adapted to develop a very high frictional capacity due to the powerful leverage exerted by the friction lever 57.

In assembling the gear of Figs. 6 to 11, inclusive, the stem 49 is slipped into place with the tongue 52 of the casing in the slot 50 and the projection 53 on the stem in the slot 54 of the casing. The other parts, with the exception of the key 56, are placed in position and the tie bolt 62 properly adjusted. The casings are then pressed toward each other to bring the key slot in the forward end of the stem 49, which projects through the wall 55, into alignment with the slots in the friction member. The key 56 is then inserted, thus securing the stem 49 and friction member 48 together and assisting the tie bolt 29 in holding the gear to its proper assembled length.

In the operation of the gear of Figs. 6 to 11, inclusive, there is no preliminary spring action as in the form of Figs. 1 to 5, inclusive. As soon as either casing begins to move in buff or draft the friction elements begin to generate friction. The stem 49 drives its friction member 48 in between the plate and the lever, causing the free end of the lever to rotate outward against the resistance of the spring which seeks to hold the toe of the lever down against the base.

It will be seen that in my improved mechanisms all friction resistance is generated against a spring cushion instead of being mainly built up against solid metal as is usually the case with the ordinary types of gears. The spring cushion also is particularly effective in bringing about a smooth and quick action in release.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

While I have described the various mechanisms here illustrated as being arranged with the levers and friction members at the sides, it is to be understood that the mechanism will operate just as effectively with lever arm and friction member on top or bottom, or both.

What I claim is:

1. A shock absorbing mechanism comprising a pair of oppositely movable casings, a compression spring arranged therebetween, frictional members longitudinally movable with the casings arranged therebetween in parallel with the spring, certain of said members having cooperating faces at an angle to the direction of movement of the casings, and another of said members serving as a guide for one of said first mentioned members, the spring exerting a transverse pressure upon said members to increase the frictional resistance thereof, one of the frictional members being shifted in its angular relation to its casing during movement of the latter, and an equalizing block carried by said friction member to provide a constant angle of engagement with the adjacent member during the compression of the members under angling blows.

2. A shock absorbing mechanism comprising a pair of oppositely moving casings, a compression spring operating between said casings in response to relative movement therebetween, oppositely tapered frictional members rockably mounted in the respective casings and frictionally engaging each other on relative longitudinal movement of the casings, one of said members working against a fixed wall in one of said casings and the other under actuation of the spring being rocked transversely of the casings to increase the frictional pressure between the frictional members and said wall.

3. A shock absorbing mechanism comprising a pair of oppositely movable casings, a compression spring extending substantially from end to end of the casings tending to maintain the casings a maximum distance apart, normally inactive frictional members extending longitudinally of the casing and adapted to be brought into frictional engagement with each other upon actuation of one of them by the spring, the said casings being adapted to be moved toward each other either in buff or draft, such movement being successively resisted by the spring and then by the spring and frictional members.

4. A shock absorbing mechanism comprising a pair of oppositely movable casings, a compression spring arranged therebetween, frictional members, each of which is engaged by and is longitudinally movable with one of the casings, one of the said members being in form a bellcrank lever, one arm of the lever engaging one of the frictional members and the other a spring equalizing follower engaging the spring whereby compression of the mechanism causes frictional pressures to be set up between said frictional members proportionate to the pressure of the spring transmitted through the follower to the said lever arm, said follower, during a portion of the compression of the mechanism, being supported by one of said casings.

5. A shock absorbing mechanism comprising a pair of oppositely movable casings, friction members mounted in said casings in overlapping relation to one another and movable longitudinally with said casings; a friction lever mounted in one of said casings, a spring arranged between said casings and reacting at one end against said friction lever, said friction lever having an arm pressing said friction elements together, whereby the pressure between said elements is proportional to the compression of said spring.

6. A shock absorbing mechanism comprising a pair of oppositely movable casings, a compression spring arranged therebetween, frictional members longitudinally movable with the casings, certain of said members being normally out of frictional engagement but being frictionally engaged upon relative movement of said casings, said certain members having cooperating friction faces at an angle to the direction of movement of the casings and said spring cooperating with one of said members to produce a transverse pressure between said members to increase the frictional resistance thereof.

HARRY T. KRAKAU.